(12) United States Patent
Lehtiniemi et al.

(10) Patent No.: US 11,194,329 B2
(45) Date of Patent: Dec. 7, 2021

(54) VEHICLE CONTROL

(71) Applicant: Nokia Technologies Oy, Espoo (FI)

(72) Inventors: Arto Lehtiniemi, Lempaala (FI);
Ville-Veikko Mattila, Tampere (FI);
Jussi Artturi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 228 days.

(21) Appl. No.: 15/501,546

(22) PCT Filed: Aug. 4, 2015

(86) PCT No.: PCT/EP2015/067987
§ 371 (c)(1),
(2) Date: Feb. 3, 2017

(87) PCT Pub. No.: WO2016/020400
PCT Pub. Date: Feb. 11, 2016

(65) Prior Publication Data
US 2017/0227964 A1   Aug. 10, 2017

(30) Foreign Application Priority Data
Aug. 8, 2014  (EP) ..................... 14180330

(51) Int. Cl.
*G05D 1/00* (2006.01)
*G08G 1/005* (2006.01)
(Continued)

(52) U.S. Cl.
CPC ............ *G05D 1/0088* (2013.01); *G08G 1/00* (2013.01); *G08G 1/005* (2013.01); *G08G 1/166* (2013.01)

(58) Field of Classification Search
None
See application file for complete search history.

(56) References Cited

U.S. PATENT DOCUMENTS 8,253,589 B2 *  8/2012  Grimm ................ G01S 5/0072
340/539.1
9,120,484 B1 *  9/2015  Ferguson ............ G05D 1/0214
(Continued)

FOREIGN PATENT DOCUMENTS

DE    10 2014 219 665 A1    4/2015
JP        2009123105 A       6/2009
(Continued)

OTHER PUBLICATIONS

Coxworth, Ben., "New system warns drivers of pedestrians, even when they're not in view", Jan. 22, 2014, www.gizmag.com, 6 pgs.
(Continued)

*Primary Examiner* — Navid Ziaeianmehdizadeh
(74) *Attorney, Agent, or Firm* — Harrington & Smith

(57) ABSTRACT

Apparatuses, computer programs and methods are provided. A first method includes responding to user input, at a wearable user input device, by causing transmission of a radio frequency signal includes a request from a pedestrian wearer of the wearable user input device. The request may be a request to cross a road. A second method includes responding to the user input, provided by the pedestrian wearer of the wearable user input device, by causing motion of a vehicle to change. The motion of the vehicle may be changed in order to enable the pedestrian to cross the road.

17 Claims, 13 Drawing Sheets

(51) Int. Cl.
*G08G 1/16* (2006.01)
*G08G 1/00* (2006.01)

(56) References Cited

U.S. PATENT DOCUMENTS

| | | |
|---|---|---|
| 9,142,127 B1* | 9/2015 | McDevitt-Pimbley ..................... H04W 4/90 |
| 2012/0083960 A1* | 4/2012 | Zhu .......................... G06T 7/223 701/23 |
| 2013/0060400 A1* | 3/2013 | Hahne .................... G08G 1/161 701/1 |
| 2014/0136414 A1* | 5/2014 | Abhyanker ............ G06Q 50/28 705/44 |
| 2015/0094878 A1 | 4/2015 | Miura et al. |
| 2015/0130355 A1* | 5/2015 | Rains, Jr. ............ H05B 37/0227 315/134 |
| 2015/0179062 A1* | 6/2015 | Ralston ................ G08G 1/0145 701/117 |
| 2015/0228195 A1* | 8/2015 | Beaurepaire ......... G08G 1/0962 340/907 |
| 2015/0336502 A1* | 11/2015 | Hillis ....................... B60Q 1/26 701/23 |
| 2016/0062573 A1* | 3/2016 | Dascola ................ G06F 3/0482 715/810 |

FOREIGN PATENT DOCUMENTS

| | | |
|---|---|---|
| JP | 2011076568 A | 4/2011 |
| JP | 2012098872 A | 5/2012 |

OTHER PUBLICATIONS

Anonymous, "Pedestrian" Wikipedia the free encyclopedia, May 18, 2015, 4 pgs.

Singh, Kyli, "If You're Not Wearing Any Clothes, Here's Where to Put Your Phone", www.mashable.com, Feb. 16, 2016, 7 pgs.

Liao, Chen-Fu, et al., "Development of Mobile Accessible Pedestrian Signals (MAPS) for Blind Pedestrians at signalized Intersections", ITS Institute, Center for Transportation Studies, University of Minnesota, Jun. 1, 2011, 135 pgs.

Chi, Benny, "4 Year Old Justin Jee—RC Heli Stick Movement—Sep. 2006", Apr. 28, 2007, www.JustinJee.com, 1 pg.

* cited by examiner

VEHICLE CONTROL

TECHNOLOGICAL FIELD

Embodiments of the present invention relate to vehicle control. Some embodiments relate to controlling vehicles to provide pedestrians with safe passage across roads.

BACKGROUND

Autonomous and semi-autonomous vehicles are configured for unmanned operation. That is, autonomous and semi-autonomous vehicles are configured to move from one location to another, without a human driver positioned in the vehicle.

An autonomous vehicle is a vehicle that is configured to navigate, steer, accelerate and decelerate autonomously (without any human driver being positioned in or outside the vehicle that is operating the vehicle).

A semi-autonomous vehicle is a vehicle that is configured to navigate, steer, accelerate and/or decelerate, without any human driver being present in the vehicle that is operating the vehicle, in response to instructions received from a remote location (for example, wirelessly). An autonomous vehicle might be operated semi-autonomously, for instance, if it no longer becomes possible for the vehicle to operate autonomously for some reason.

Some autonomous and/or semi-autonomous vehicles may be configured to sense pedestrians (for example, using a laser sensing system) and take steps to prevent a collision with a pedestrian from occurring. However, the behavior of pedestrians can be unpredictable, making it difficult for autonomous and/or semi-autonomous vehicles to determine the next movement of a pedestrian. Also, it is often unclear to a pedestrian whether he/she has been "seen" by an autonomous/semi-autonomous vehicle. This can make it difficult for a pedestrian to know whether it is safe to cross a road, for example.

BRIEF SUMMARY

According to various, but not necessarily all, embodiments of the invention there is provided a method, comprising: responding to user input, provided by a pedestrian at a wearable user input device, by causing motion of a vehicle to change.

According to various, but not necessarily all, embodiments of the invention there is provided computer program code that, when performed by at least one processor, causes at least the following to be performed: responding to user input, provided by a pedestrian at a wearable user input device, by causing motion of a vehicle to change.

The computer program code may be stored on a non-transitory computer readable medium.

According to various, but not necessarily all, embodiments of the invention there is provided an apparatus, comprising: means for responding to user input, provided by a pedestrian at a wearable user input device, by causing motion of a vehicle to change.

According to various, but not necessarily all, embodiments of the invention there is provided an apparatus, comprising: at least one processor; and memory comprising computer program code configured to, with the at least one processor, cause at least the following to be performed: responding to user input, provided by a pedestrian at a wearable user input device, by causing motion of a vehicle to change.

According to various, but not necessarily all, embodiments of the invention there is provided a method, comprising: responding to user input, at a wearable user input device, by causing transmission of a radio frequency signal comprising a request from a pedestrian wearer of the wearable user input device to cross a road.

According to various, but not necessarily all, embodiments of the invention there is provided computer program code that, when performed by at least one processor, causes at least the following to be performed: responding to user input, at a wearable user input device, by causing transmission of a radio frequency signal comprising a request from a pedestrian wearer of the wearable user input device.

According to various, but not necessarily all, embodiments of the invention there is provided an apparatus, comprising: means for responding to user input, at a wearable user input device, by causing transmission of a radio frequency signal comprising a request from a pedestrian wearer of the wearable user input device.

According to various, but not necessarily all, embodiments of the invention there is provided an apparatus, comprising: at least one processor; and memory comprising computer program code configured to, with the at least one processor, cause at least the following to be performed: responding to user input, at a wearable user input device, by causing transmission of a radio frequency signal comprising a request from a pedestrian wearer of the wearable user input device.

According to various, but not necessarily all, embodiments of the invention there is provided a method, comprising: responding to a signal, transmitted by a device of a pedestrian and comprising a request to cross a road, by controlling motion of an autonomous or semi-autonomous vehicle in order to enable the pedestrian to cross the road.

According to various, but not necessarily all, embodiments of the invention there is provided an apparatus, comprising: means for responding to a signal, transmitted by a device of a pedestrian and comprising a request to cross a road, by controlling motion of an autonomous or semi-autonomous vehicle in order to enable the pedestrian to cross the road.

According to various, but not necessarily all, embodiments of the invention there is provided an apparatus, comprising: at least one processor; and memory comprising computer program code configured to, with the at least one processor, cause at least the following to be performed: responding to a signal, transmitted by a device of a pedestrian and comprising a request to cross a road, by controlling motion of an autonomous or semi-autonomous vehicle in order to enable the pedestrian to cross the road.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

Figure 1A:
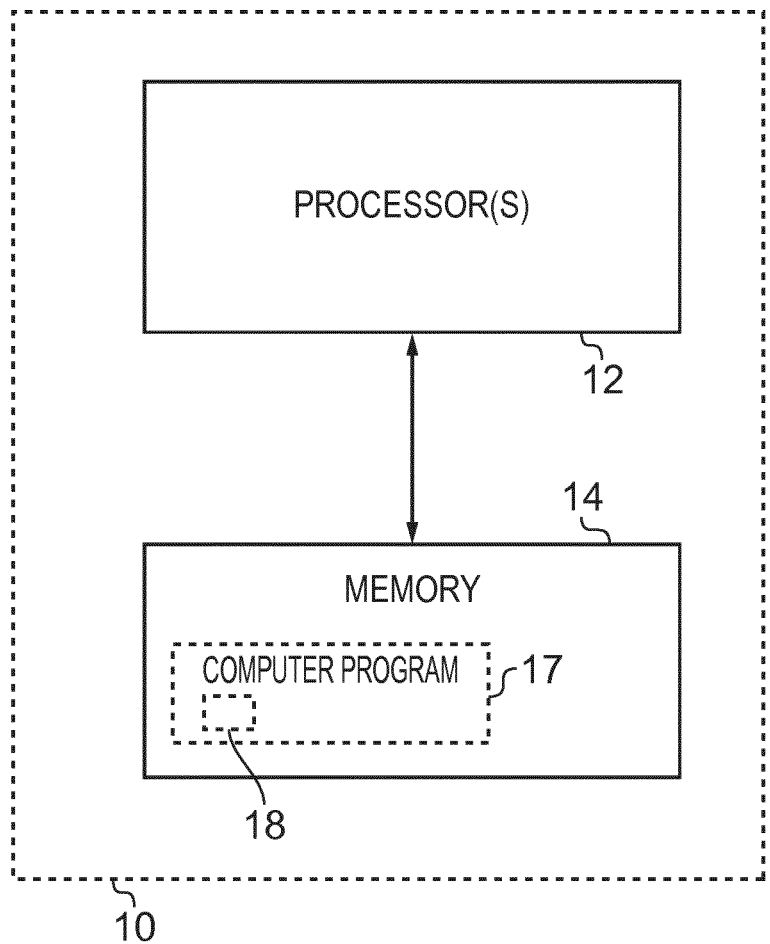
FIG. 1A illustrates a schematic of an apparatus in the form of a chipset for a wearable user input device.
Figure 1A:
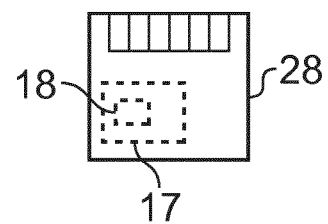

Embodiments of the invention relate to enabling pedestrians to communicate with autonomous and/or semi-autonomous vehicles. The communication between the pedestrian and the vehicles may provide the pedestrian with safe passage across a road.

A pedestrian may provide input at a wearable user input device to make a request to cross a road, for example at a pedestrian crossing. The pedestrian's request to cross the road may be communicated to an autonomous or semi-autonomous vehicle, and cause motion of the vehicle to be changed to enable the pedestrian to cross the road. For example, the vehicle may decelerate to enable the pedestrian to cross the road.

A technical effect of embodiments of the invention is that it enables a pedestrian to communicate with (and potentially control) autonomous and semi-autonomous vehicles, in a safe manner.

In this regard, the figures illustrate an apparatus 10/20/100/200, comprising: means 12, 14, 17, 18, 112, 114, 117, 118 for responding to user input, at a wearable user input device 20, by causing transmission of a radio frequency signal 701/702/707/709/711 comprising a request from a pedestrian wearer 60 of the wearable user input device 20 to cross a road 75.

The figures also illustrate an apparatus 300/400/500/600, comprising: means 312, 314, 317, 318, 512, 514, 517, 518 for responding to user input, provided by a pedestrian 60 at a wearable user input device 20, by causing motion of a vehicle 50 to change.

Wearable User Input Device

FIG. 1A illustrates an apparatus 10 that may be a chip or a chipset. The apparatus 10 may form part of a wearable user input device such as that illustrated in FIG. 1B.

The apparatus 10 comprises at least one processor 12 and at least one memory 14. A single processor 12 and a single memory 14 are shown in FIG. 1A for illustrative purposes. The processor 12 is configured to read from and write to the memory 14. The processor 12 may comprise an output interface via which data and/or commands are output by the processor 12 and an input interface via which data and/or commands are input to the processor 12.

The memory 14 is illustrated as storing a computer program 17 which comprises computer program instructions/code 18 that control the operation of the apparatus 10 when loaded into the processor 12. The processor 12, by reading the memory 14, is able to load and execute the computer program code 18. The computer program code 18 provides the logic and routines that enables the apparatus 10 to perform at least part of the methods illustrated in FIGS. 5 and 6 and described below. In this regard, the processor 12 and the computer program code 18 provide means for performing at least part of the methods illustrated in FIGS. 5 and 6 and described below.

Although the memory 14 is illustrated as a single component in FIG. 1A, it may be implemented as one or more separate components, some or all of which may be integrated/removable and/or may provide permanent/semi-permanent/dynamic/cached storage.

Figure 1B:
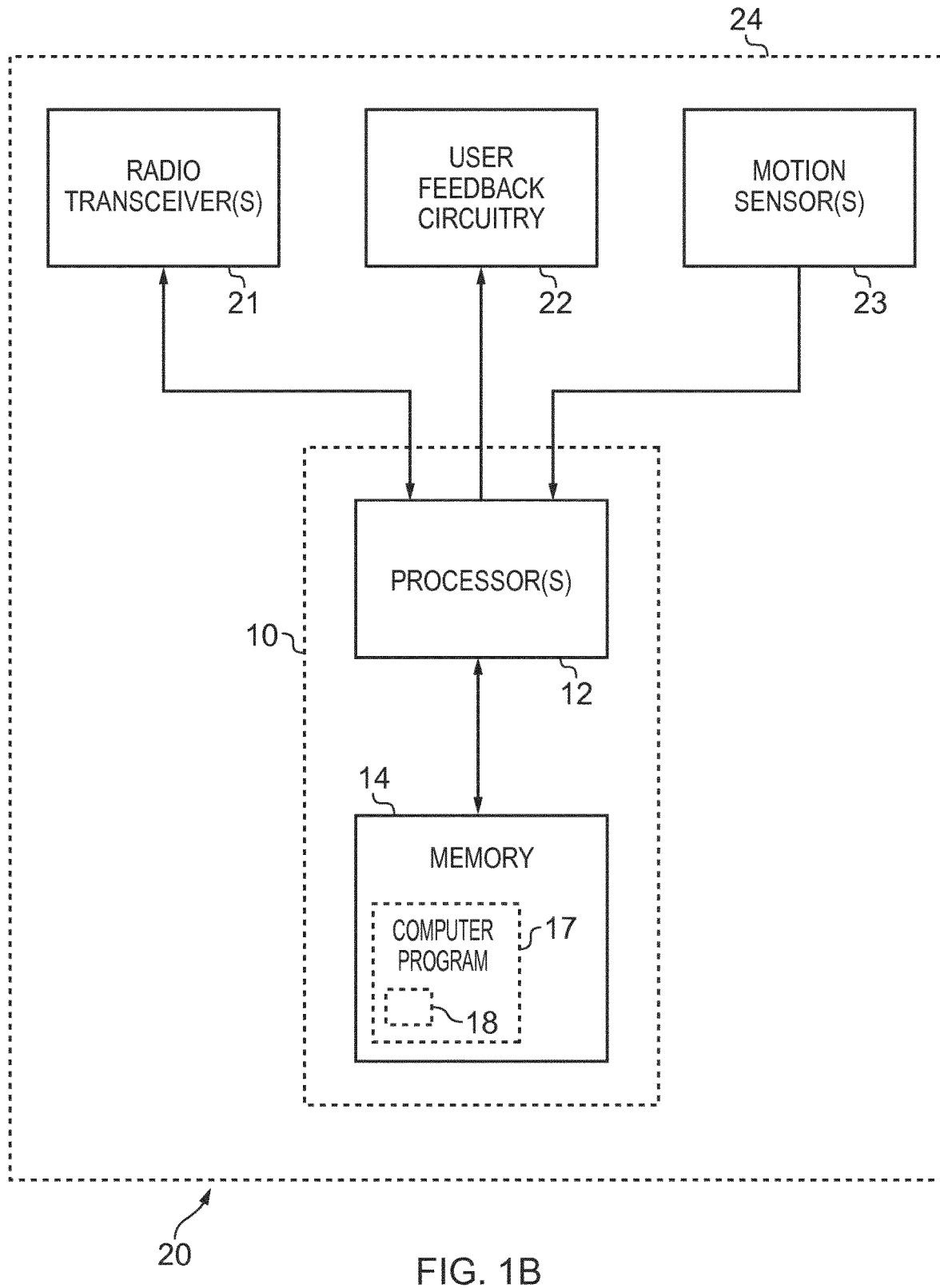
FIG. 1B illustrates a schematic of an apparatus in the form of a wearable user input device.

The computer program code 18 may arrive at the apparatus 10 via any suitable delivery mechanism 28. The delivery mechanism 28 may be, for example, a non-transitory computer-readable storage medium such as an optical disc or a memory card. The delivery mechanism 28 may be a signal configured to reliably transfer the computer program code 18. The apparatus 10 may cause the propagation or transmission of the computer program code 18 as a computer data signal. FIG. 1B illustrates an apparatus 20 in the form of a wearable user input device. The wearable user input device 20 may, for example, be shaped to be worn on an appendage of a person, such as a wrist. The wearable user input device 20 may function as a fitness tracker and/or a watch, for example.

The example of the wearable user input device 20 illustrated in FIG. 1B includes one or more radio transceivers 21, user feedback circuitry 22, one or more motion sensors 23 and the apparatus 10 illustrated in FIG. 1A co-located in a housing 24. In other examples, the wearable user input device 20 might, for example, comprise other elements such as one or more keys which enable a user to provide user input. The wearable user input device 20 might, for example, comprise positioning circuitry that is configured to determine a position of the wearable user input device 20. Such positioning circuitry may or may not share some components with the one or more radio frequency transceivers 21, and may or may not comprise satellite positioning circuitry.

The elements 12, 14, 21, 22 and 23 are operationally coupled and any number or combination of intervening elements can exist between them (including no intervening elements).

The one or more radio frequency transceivers 21 are configured to transmit and receive radio frequency signals. For instance, the one or more radio frequency transceivers 21 might be compatible with one or more short range radio protocols, such as Bluetooth or Wi-Fi protocols. Alternatively or additionally, the one or more radio frequency transceivers may be compatible with one or more longer range radio protocols, such as one or more cellular telephone protocols.

The processor 12 is configured to control the one or more radio frequency transceivers 21 to transmit radio frequency signals comprising data. The processor 12 is also configured to receive inputs from the one or more radio frequency transceivers 21 in the form of data contained in received radio frequency signals.

The one or more motion sensors 23 are configured to sense motion of the wearable user input device 20 and provide inputs to the processor 12 that are representative of that motion. The one or more motion sensors 23 may comprise one or more accelerometers and/or one or more gyroscopes, for instance.

A user may provide user input, in the form of a gesture, by performing a gesture in which the wearable user input device 20 is moved through the air. The one or more motion sensors 23 sense the motion of the wearable user input device 20 through the air and provide inputs to the processor 12 that are representative of that motion. The processor 12 is configured to identify particular gestures/user inputs made by the user from the inputs provided to it by the motion sensor(s) 23.

The processor 12 is configured to control the user feedback circuitry 22 to provide feedback to a wearer/user of the wearable user input device 20. The user feedback circuitry 22 is configured to provide aural, visual and/or vibratory feedback to the wearer. In this regard, the user feedback circuitry 22 may comprise one or more loudspeakers, one or more displays and/or one or more vibrating elements. Feedback provided to the wearer by the user feedback circuitry 22 may confirm, for example, that a gesture has successfully been identified by the processor 12 on the basis of inputs provided by the motion sensor(s) 23. Alternatively or additionally, the feedback provided to the wearer by the user feedback circuitry 22 may confirm that an action has been carried out by another apparatus, such as an autonomous vehicle or a semi-autonomous vehicle.

Portable Electronic Device

Figure 2A:
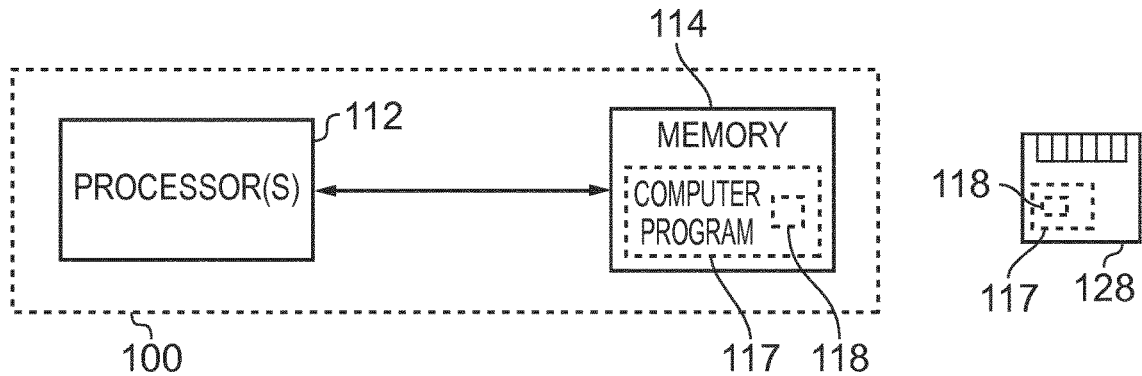
FIG. 2A illustrates a schematic of an apparatus in the form of a chipset for a portable electronic device.

FIG. 2A illustrates an apparatus 100 that may be a chip or a chipset. The apparatus 100 may form part of a portable electronic device such as that illustrated in FIG. 2B.

The apparatus 100 comprises at least one processor 112 and at least one memory 114. A single processor 112 and a single memory 114 are shown in FIG. 2A for illustrative purposes. The processor 112 is configured to read from and write to the memory 114. The processor 112 may comprise an output interface via which data and/or commands are output by the processor 112 and an input interface via which data and/or commands are input to the processor 112.

The memory 114 is illustrated as storing a computer program 117 which comprises computer program instructions/code 118 that control the operation of the apparatus 100 when loaded into the processor 112. The processor 112, by reading the memory 114, is able to load and execute the computer program code 118. The computer program code 118 provides the logic and routines that enables the apparatus 100 to perform at least part of the methods illustrated in FIGS. 5 and 6 and described below. In this regard, the processor 112 and the computer program code 118 provide means for performing at least part of the methods illustrated in FIGS. 5 and 6 and described below.

Although the memory 114 is illustrated as a single component in FIG. 2A, it may be implemented as one or more separate components, some or all of which may be integrated/removable and/or may provide permanent/semi-permanent/dynamic/cached storage.

The computer program code 118 may arrive at the apparatus 100 via any suitable delivery mechanism 128. The delivery mechanism 128 may be, for example, a non-transitory computer-readable storage medium such as an optical disc or a memory card. The delivery mechanism 128 may be a signal configured to reliably transfer the computer program code 118. The apparatus 100 may cause the propagation or transmission of the computer program code 118 as a computer data signal.

Figure 2B:
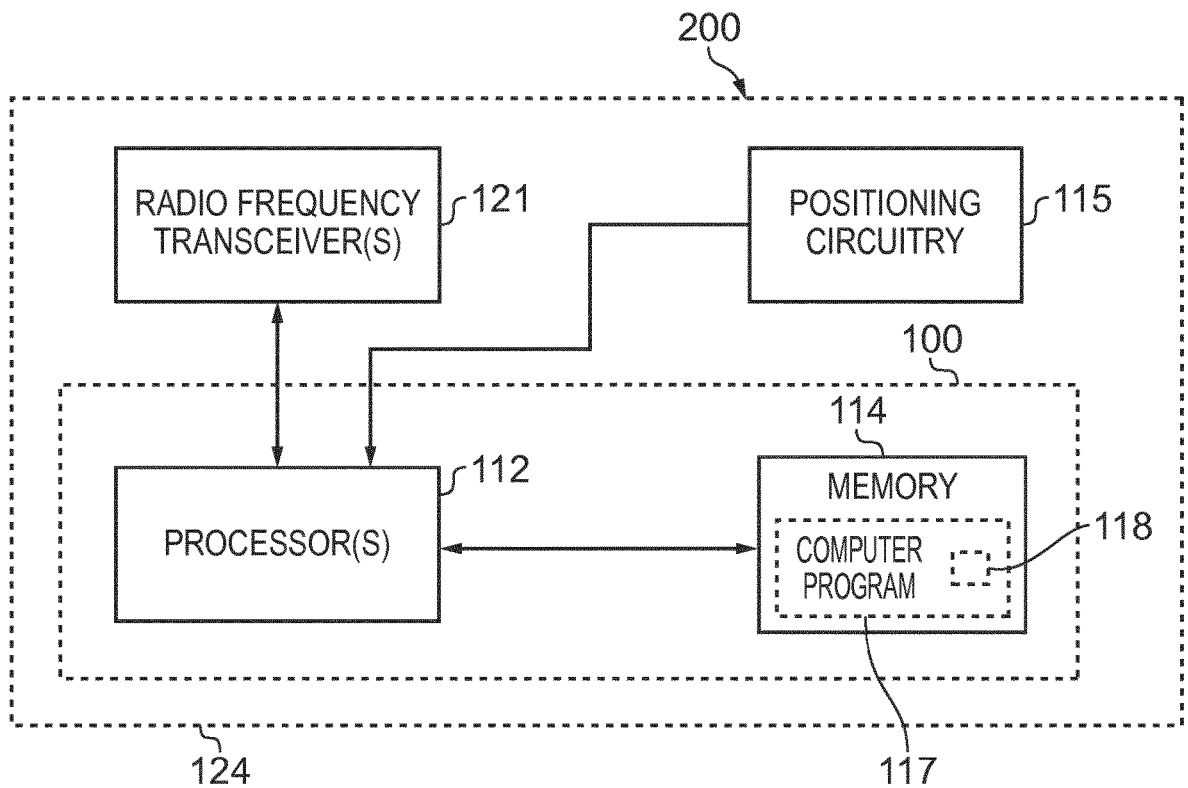
FIG. 2B illustrates a schematic of an apparatus in the form of a portable electronic device.

FIG. 2B illustrates an apparatus 200 in the form of a portable electronic device. The portable electronic device 200 may, for example, be a hand held portable electronic device such as a mobile telephone.

The example of the portable electronic device 200 illustrated in FIG. 2B includes one or more radio transceivers 121 and the apparatus 100 illustrated in FIG. 2A co-located in a housing 124. Optionally, the portable electronic device 200 further comprises positioning circuitry 115. The positioning circuitry 115 is configured to provide inputs to the processor 112. The positioning circuitry 115 is configured to determine a position of the portable electronic device 200. The positioning circuitry 115 may or may not share some components with the one or more radio frequency transceivers 121, and may or may not comprise satellite positioning circuitry.

The portable electronic device 200 may also comprise a display and user input circuitry, at least some of which may be integrated into the display in the form of a touch sensitive display.

The elements 112, 114, 115 and 121 are operationally coupled and any number or combination of intervening elements can exist between them (including no intervening elements).

The one or more radio frequency transceivers 121 are configured to transmit and receive radio frequency signals. For instance, the one or more radio frequency transceivers 121 might be compatible with one or more short range radio protocols, such as Bluetooth or Wi-Fi protocols. Alternatively or additionally, the one or more radio frequency transceivers may be compatible with one or more longer range radio protocols, such as one or more cellular telephone protocols.

The processor 112 is configured to control the one or more radio frequency transceivers 121 to transmit radio frequency signals comprising data. The processor 112 is also configured to receive inputs from the one or more radio frequency transceivers 121 in the form of data contained in received radio frequency signals.

Network/Server

Figure 3A:
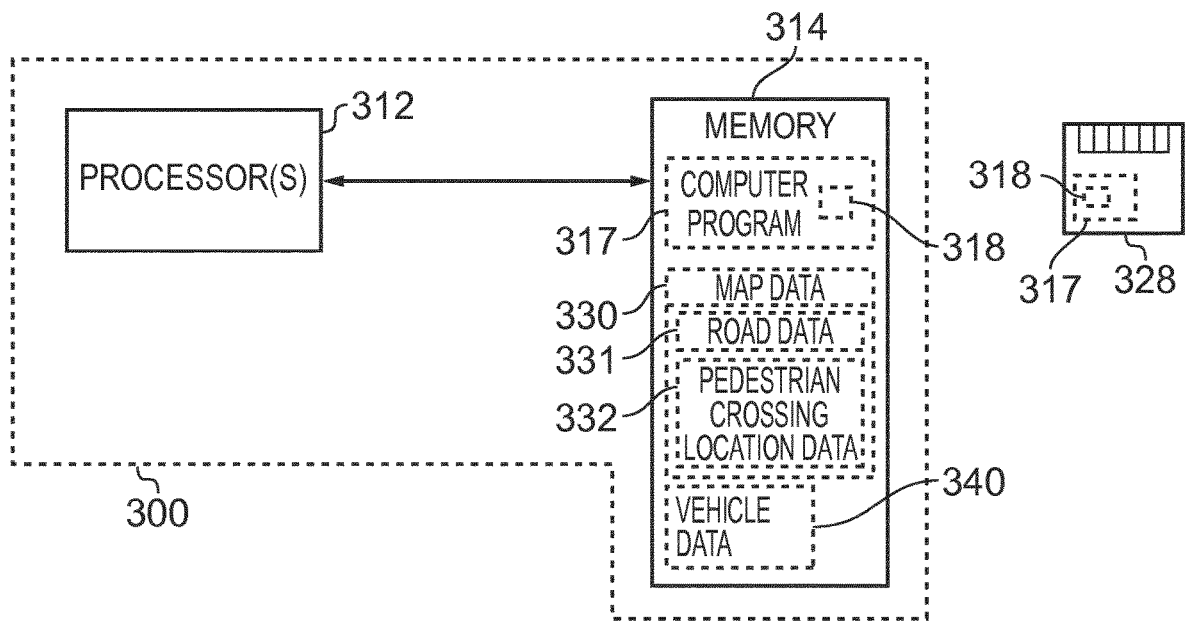
FIG. 3A illustrates a schematic of an apparatus in the form of a chipset for a server/network.

FIG. 3A illustrates an apparatus 300 that may be a chip or a chipset. The apparatus 300 may form part of a server for controlling autonomous vehicles and/or semi-autonomous vehicles.

The apparatus 300 comprises at least one processor 312 and at least one memory 314. A single processor 312 and a single memory 314 are shown in FIG. 3A for illustrative purposes. The processor 312 is configured to read from and write to the memory 314. The processor 312 may comprise an output interface via which data and/or commands are output by the processor 312 and an input interface via which data and/or commands are input to the processor 312.

The memory 314 is illustrated as storing a computer program 317 which comprises computer program instructions/code 318 that control the operation of the apparatus 300 when loaded into the processor 312. The processor 312, by reading the memory 314, is able to load and execute the computer program code 318. The computer program code 318 provides the logic and routines that enables the apparatus 300 to perform at least part of the methods illustrated in FIGS. 5 and 6 and described below. In this regard, the processor 312 and the computer program code 318 provide means for performing at least part of the methods illustrated in FIGS. 5 and 6 and described below.

In FIG. 3A, the memory 314 is illustrated as storing map data 330 and vehicle data 340. The map data 330 comprises road data 331 and pedestrian crossing location data 332. The road data 331 defines a road network and enables the processor 312 to determine a route for a vehicle (such as an autonomous vehicle or a semi-autonomous vehicle) from one location to another. The pedestrian crossing location data 332 defines the locations of pedestrian crossings in the road network.

The vehicle data 340 may include the locations of one or more autonomous vehicle and/or one or more semi-autonomous vehicles. The vehicle data 340 may also define one or more routes for one or more autonomous vehicles and/or one or more semi-autonomous vehicles. Each defined route may indicate expected locations of each vehicle at various instances in time, along the defined route.

Although the memory 314 is illustrated as a single component in FIG. 3A, it may be implemented as one or more separate components, some or all of which may be integrated/removable and/or may provide permanent/semi-permanent/dynamic/cached storage.

The computer program code 318 may arrive at the apparatus 300 via any suitable delivery mechanism 328. The delivery mechanism 328 may be, for example, a non-transitory computer-readable storage medium such as an optical disc or a memory card. The delivery mechanism 328 may be a signal configured to reliably transfer the computer program code 318. The apparatus 300 may cause the propagation or transmission of the computer program code 318 as a computer data signal.

Figure 3B:
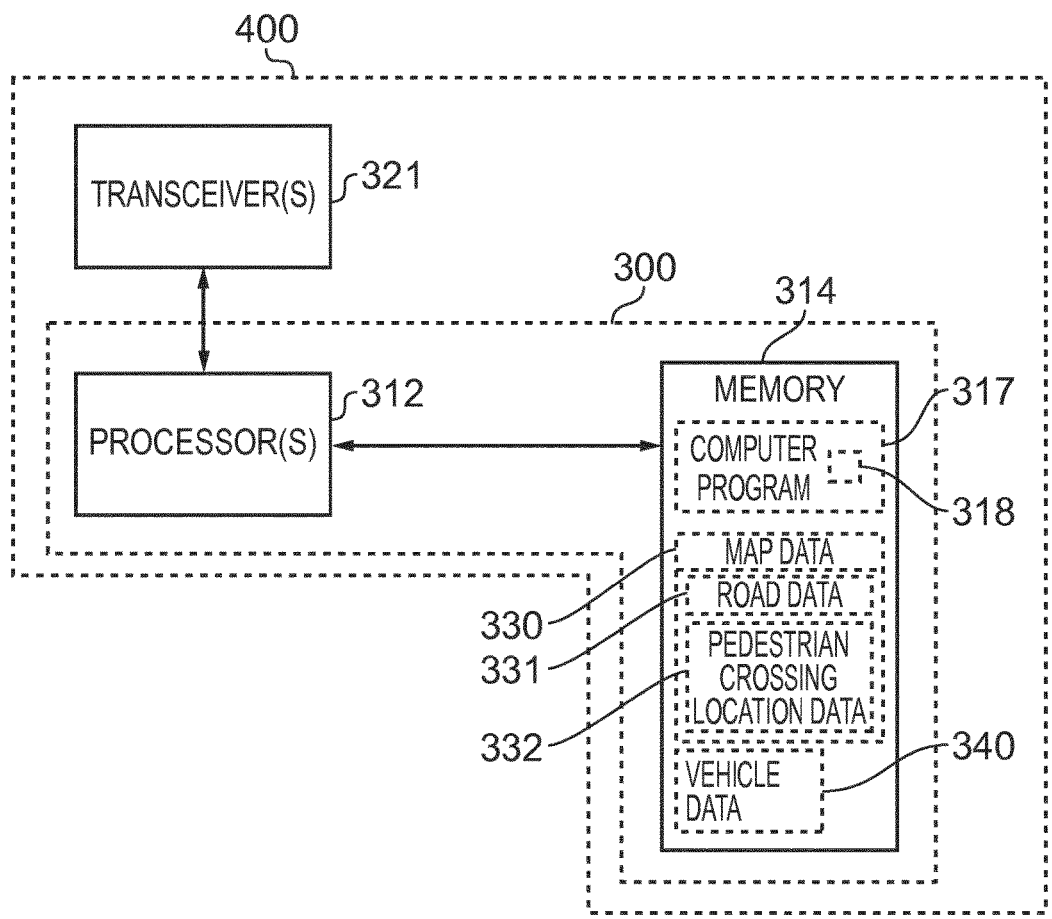
FIG. 3B illustrates a schematic of an apparatus in the form of a server or a portion of a network for controlling autonomous vehicles and/or semi-autonomous vehicles.

FIG. 3B illustrates an apparatus 400 that, in some examples, is a server. The apparatus 400 comprises one or more transceivers 321 and the apparatus 300 illustrated in FIG. 3A. If the apparatus 400 is a server, the transceiver(s) 321 may be or comprise a wired transceiver that enables the server to communicate in a network.

In other examples, the apparatus 400 comprises a server and other aspects of a wireless communications network, such as one or more cellular base stations and/or one or more wireless access points (for example, in the form of one or more WiFi access points). In these examples, the one or more transceivers 321 may comprise one or more wired transceivers and one or more radio frequency transceivers The one or more radio frequency transceivers are configured to transmit and receive radio frequency signals. For instance, the one or more radio frequency transceivers 321 might be compatible with one or more short range radio protocols, such as Bluetooth or Wi-Fi protocols. Alternatively or additionally, the one or more radio frequency transceivers may be compatible with one or more longer range radio protocols, such as one or more cellular telephone protocols.

The processor 312 is configured to control the one or more transceivers 312 to transmit signals comprising data. The processor 312 is also configured to receive inputs from the one or more transceivers 321 in the form of data contained in received signals.

The elements 312, 314 and 321 are operationally coupled and any number or combination of intervening elements can exist between them (including no intervening elements).

Vehicle Control System

Figure 4A:
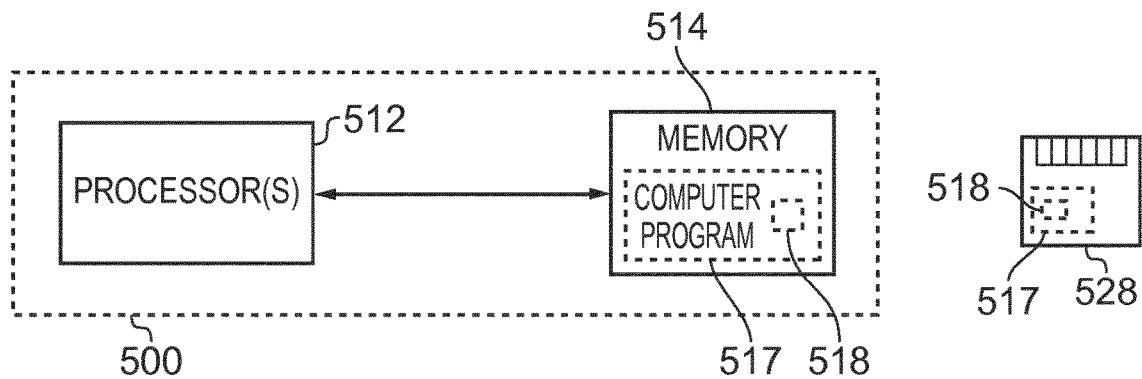
FIG. 4A illustrates a schematic of an apparatus in the form of a chipset for a vehicle.

FIG. 4A illustrates an apparatus 500 that may be a chip or a chipset. The apparatus 500 may form part of a vehicle control system for an autonomous or semi-autonomous vehicle, such as that illustrated in FIG. 4B.

The apparatus 500 comprises at least one processor 512 and at least one memory 514. A single processor 512 and a single memory 514 are shown in FIG. 4A for illustrative purposes. The processor 512 is configured to read from and write to the memory 514. The processor 512 may comprise an output interface via which data and/or commands are output by the processor 512 and an input interface via which data and/or commands are input to the processor 512.

The memory 514 is illustrated as storing a computer program 517 which comprises computer program instructions/code 518 that control the operation of the apparatus 500 when loaded into the processor 512. The processor 512, by reading the memory 514, is able to load and execute the computer program code 518. The computer program code 518 provides the logic and routines that enables the apparatus 100 to perform at least part of the methods illustrated in FIGS. 5 and 6 and described below. In this regard, the processor 512 and the computer program code 518 provide means for performing at least part of the methods illustrated in FIGS. 5 and 6 and described below.

Although the memory 514 is illustrated as a single component in FIG. 4A, it may be implemented as one or more separate components, some or all of which may be integrated/removable and/or may provide permanent/semi-permanent/dynamic/cached storage.

The computer program code 518 may arrive at the apparatus 600 via any suitable delivery mechanism 528. The delivery mechanism 528 may be, for example, a non-transitory computer-readable storage medium such as an optical disc or a memory card. The delivery mechanism 528 may be a signal configured to reliably transfer the computer program code 518. The apparatus 500 may cause the propagation or transmission of the computer program code 518 as a computer data signal.

Figure 4B:
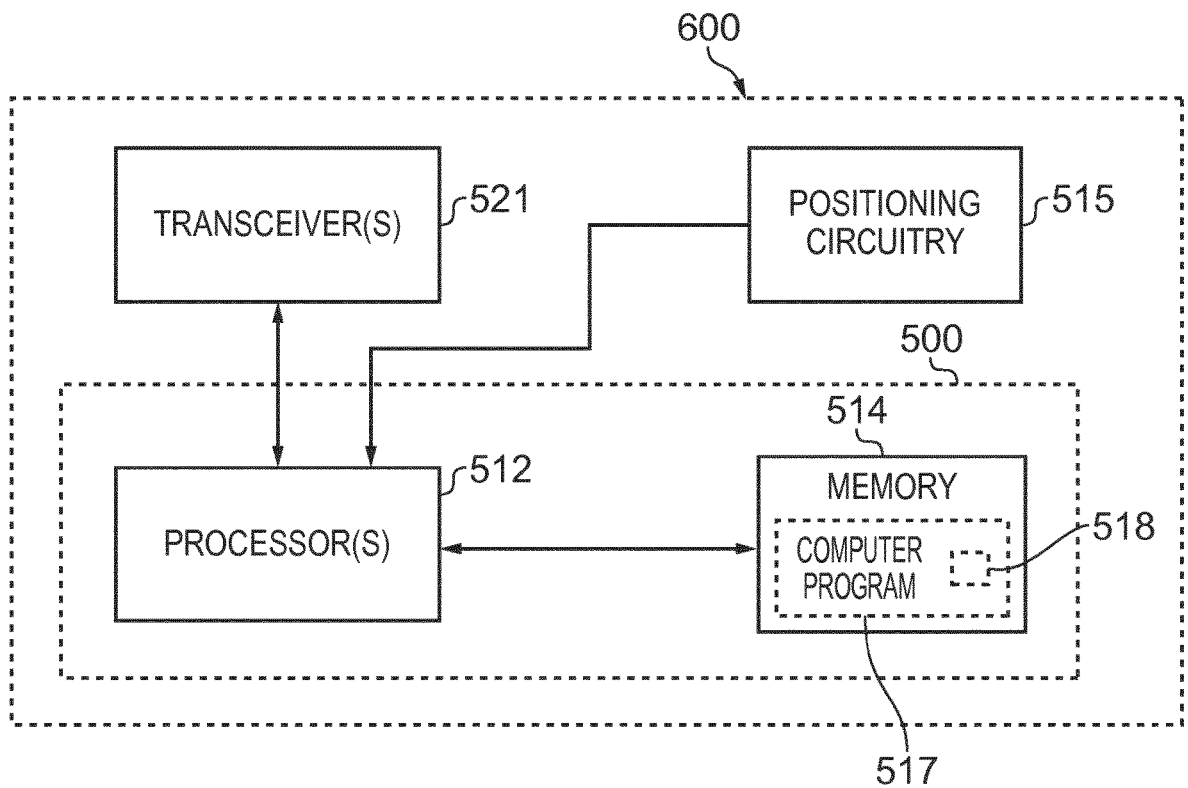
FIG. 4B illustrates a schematic of an apparatus in the form of a vehicle control system for an autonomous vehicle and/or a semi-autonomous vehicle.

FIG. 4B illustrates an apparatus 600 in the form of a vehicle control system for an autonomous or a semi-autonomous vehicle. The vehicle control system 600 may be housed in an autonomous or a semi-autonomous vehicle.

The example of the vehicle control system 600 illustrated in FIG. 4B includes one or more radio transceivers 521, positioning circuitry 515 and the apparatus 500 illustrated in FIG. 4A co-located in a vehicle.

The processor 512 is configured to receive inputs from the positioning circuitry 515. The positioning circuitry 515 is configured to determine a position of the vehicle that the vehicle control system 600 is located in. The positioning circuitry 515 may or may not share some components with the one or more radio frequency transceivers 521, and may or may not comprise satellite positioning circuitry.

The one or more radio frequency transceivers 521 are configured to transmit and receive radio frequency signals.

For instance, the one or more radio frequency transceivers might be compatible with one or more short range radio protocols, such as Bluetooth or Wi-Fi protocols. Alternatively or additionally, the one or more radio frequency transceivers may be compatible with one or more longer range radio protocols, such as one or more cellular telephone protocols.

The processor 512 is configured to control the one or more radio frequency transceivers 521 to transmit radio frequency signals comprising data. The processor 512 is also configured to receive inputs from the one or more radio frequency transceivers 521 in the form of data contained in received radio frequency signals.

The processor 512 may be configured to control the positioning circuitry to determine a position of a vehicle that the vehicle control system 600 is located in. The processor 512 may be further configured to control the one or more radio frequency transceivers 521 to transmit the determined location to the server/network 400 (and possibly the time at which the location of the vehicle was determined), to enable the server/network 400 to update the vehicle data 340.

The elements 512, 514, 515 and 521 are operationally coupled and any number or combination of intervening elements can exist between them (including no intervening elements).

First Method

A first method according to embodiments of the invention will now be described in conjunction with FIG. 5. This first method relates to a situation where a pedestrian, wearing the wearable user input device 20, wishes to cross a road.

Figure 5:
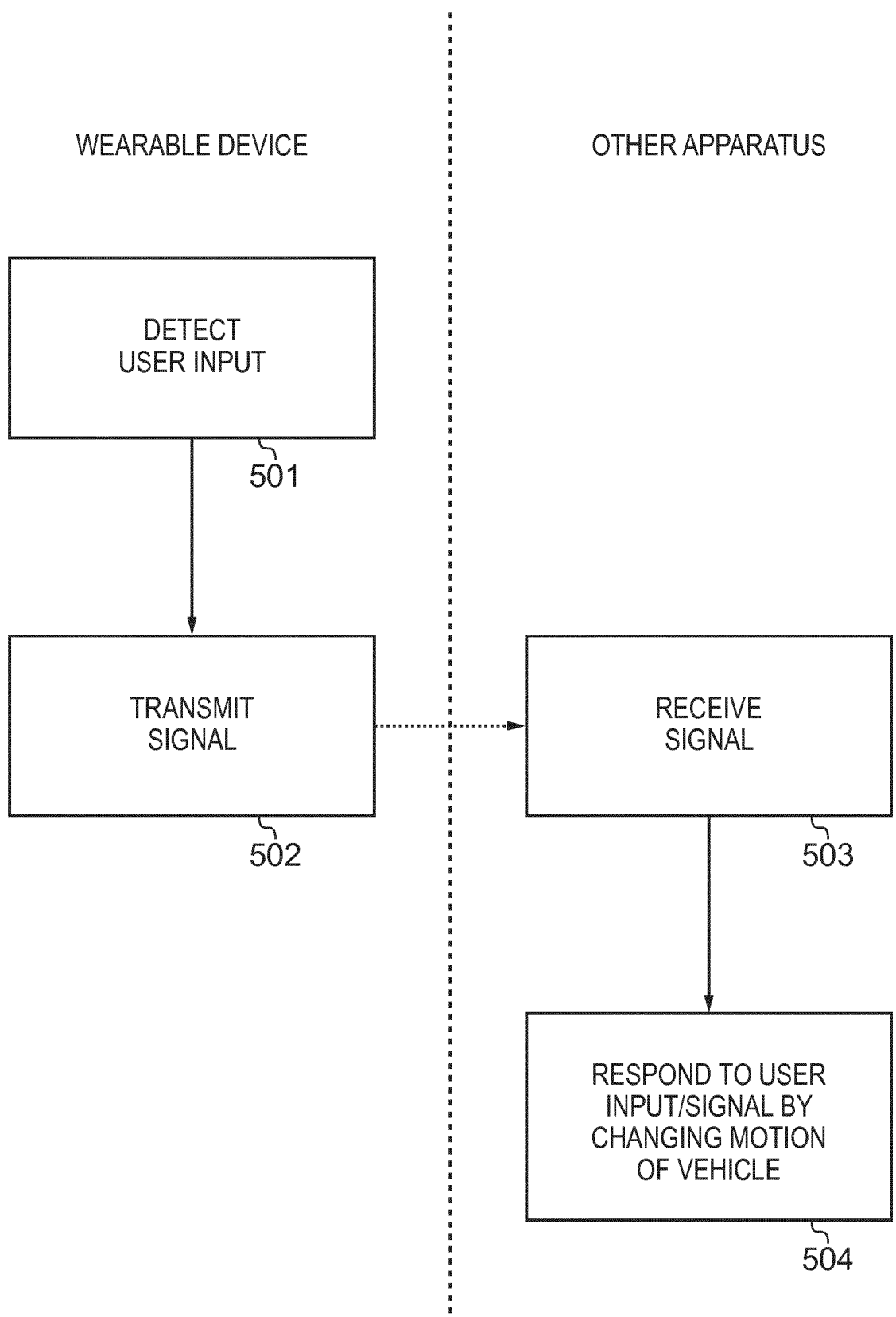
FIG. 5 illustrates a flow chart of a first method.

At block 501 in FIG. 5, the pedestrian provides user input to the wearable user input device 20. He may, for example, perform a gesture which is recognized by the processor 12 of the wearable user input device 20 from inputs provided by the one or more motion sensors 23. The gesture may involve, for instance, a pedestrian moving an arm that the wearable user input device 20 is positioned on. A user could, for example, perform the gesture by elevating his hand from a position near his waist to a position above his head.

At block 502 in FIG. 5, the processor 12 responds to detection of the user input in block 501 by controlling at least one of the one or more radio transceivers 21 of the wearable user input device 20 to transmit a radio frequency signal comprising a request from the pedestrian to cross the road.

At block 503 in FIG. 5, a signal comprising the request to cross the road is received by another apparatus. The signal that is received by the other apparatus may be the same signal that was transmitted by the wearable user input device 20 in block 502, or it may be a different signal that has been transmitted by a different device. For example, the signal that is transmitted by the wearable user input device 20 may be received and forwarded by one or more other apparatuses before a signal is received at block 503 in FIG. 5.

At block 504 in FIG. 5, the other apparatus responds to reception of the signal (and therefore also responds to the user input provided by the pedestrian at the wearable user input device 20) by causing motion of a (semi-autonomous or autonomous) vehicle to change, in order to enable the pedestrian to cross the road.

In some embodiments of the invention, the signal that is transmitted in block 502 by the wearable user input device 20 is transmitted to the portable device 200, which then transmits a further signal to the network/server 400. That further signal is the signal that is received in block 503 in FIG. 5. The server/network 400 responds at block 504 by causing a radio frequency signal to be transmitted to the (semi-autonomous or autonomous) vehicle in order to change its motion in block 504 in FIG. 5 and enable the pedestrian to cross the road.

Alternatively, the signal that is transmitted by the portable device 200 may be sent directly to the (semi-autonomous or autonomous) vehicle rather than to the network/server 400. That signal is received in block 503 by the vehicle control system 600 of the vehicle, which then processes that signal in block 504 in FIG. 5 and causes the motion of the vehicle to change.

In some other embodiments, the signal that is transmitted by the wearable user input device 20 is transmitted directly to the vehicle by the wearable user input device 20 and not to the portable device 200. That signal is received in block 503 by the vehicle control system 600 of the vehicle, which then processes that signal in block 504 in FIG. 5 and causes the motion of the vehicle to change.

In some further embodiments, the signal that is transmitted by the wearable user input device 20 may be transmitted directly to the network/server 400. The network/server 400 receives that signal in block 503 in FIG. 5 and then the network/server 400 causes the motion of the vehicle to change in block 504.

Various different embodiments of the invention will be described in more detail below in relation to FIGS. 6 to 14.

Second Method

A second method according to embodiments of the invention will now be described in conjunction with FIGS. 6 to 12.

Figure 6:
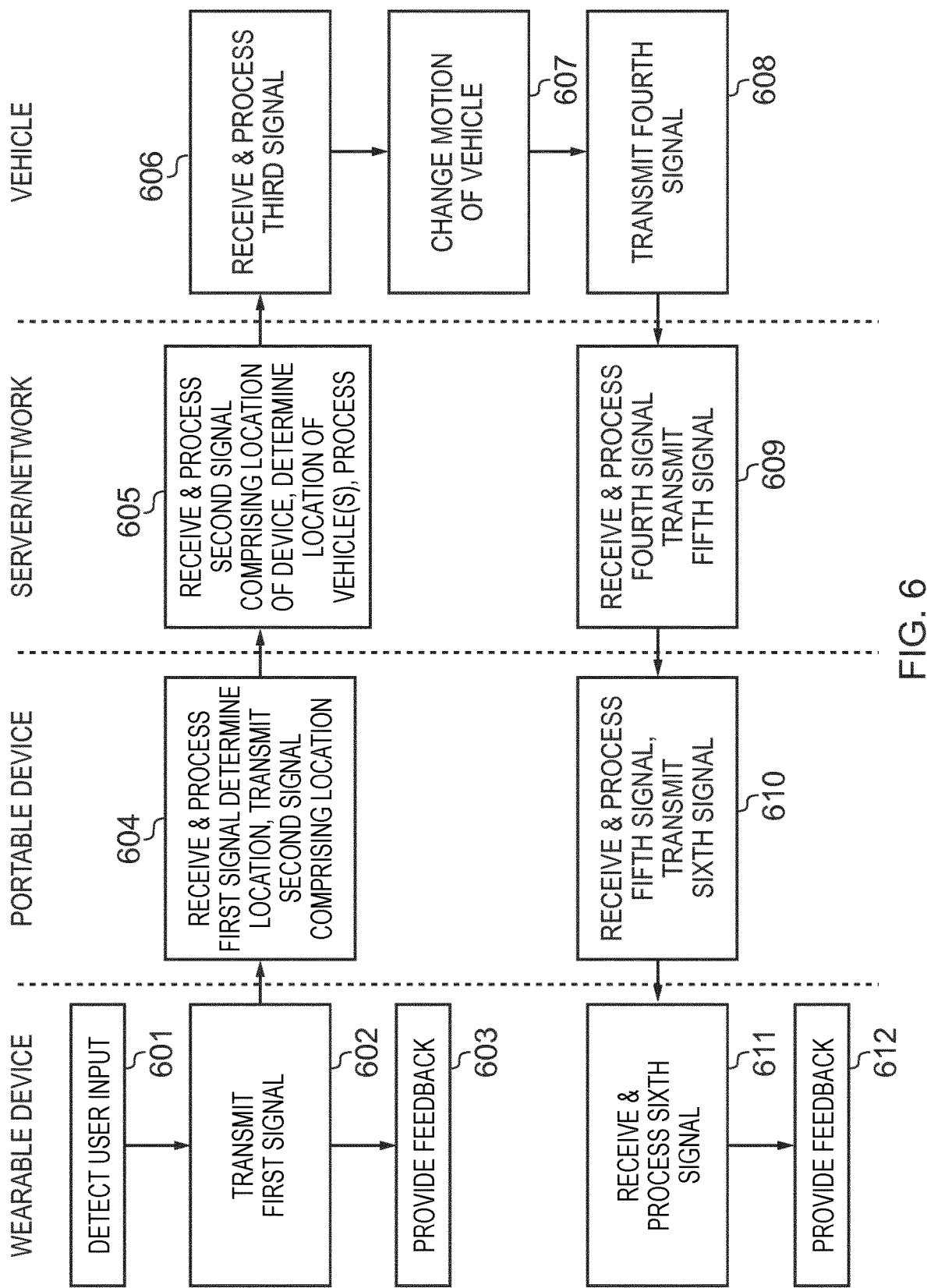
FIG. 6 illustrates a flow chart of a second method.
Figure 7:
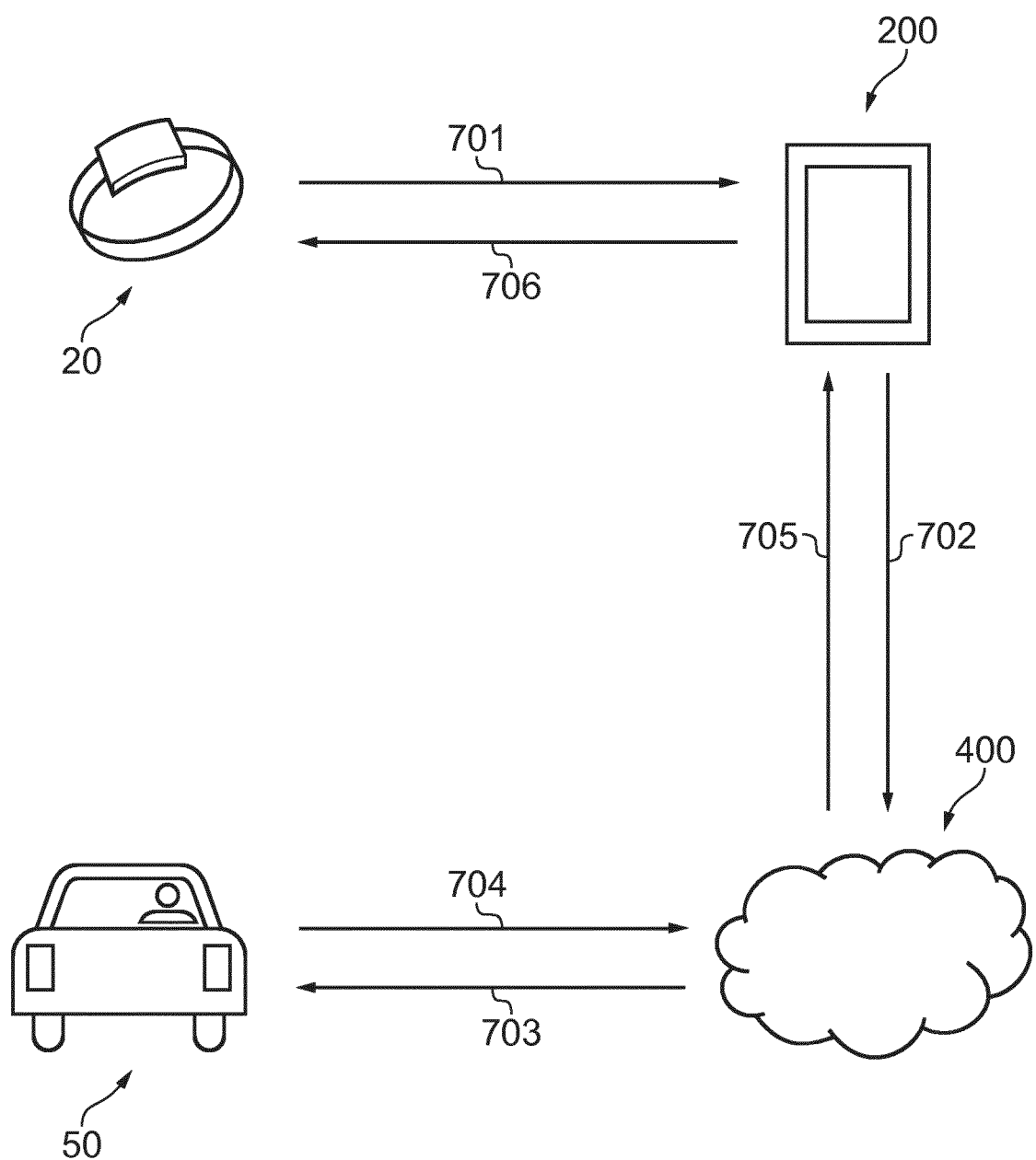
FIG. 7 illustrates a first signaling diagram for signals transferred between a wearable user input device, a portable electronic device, a network/server and a vehicle.
Figure 8:
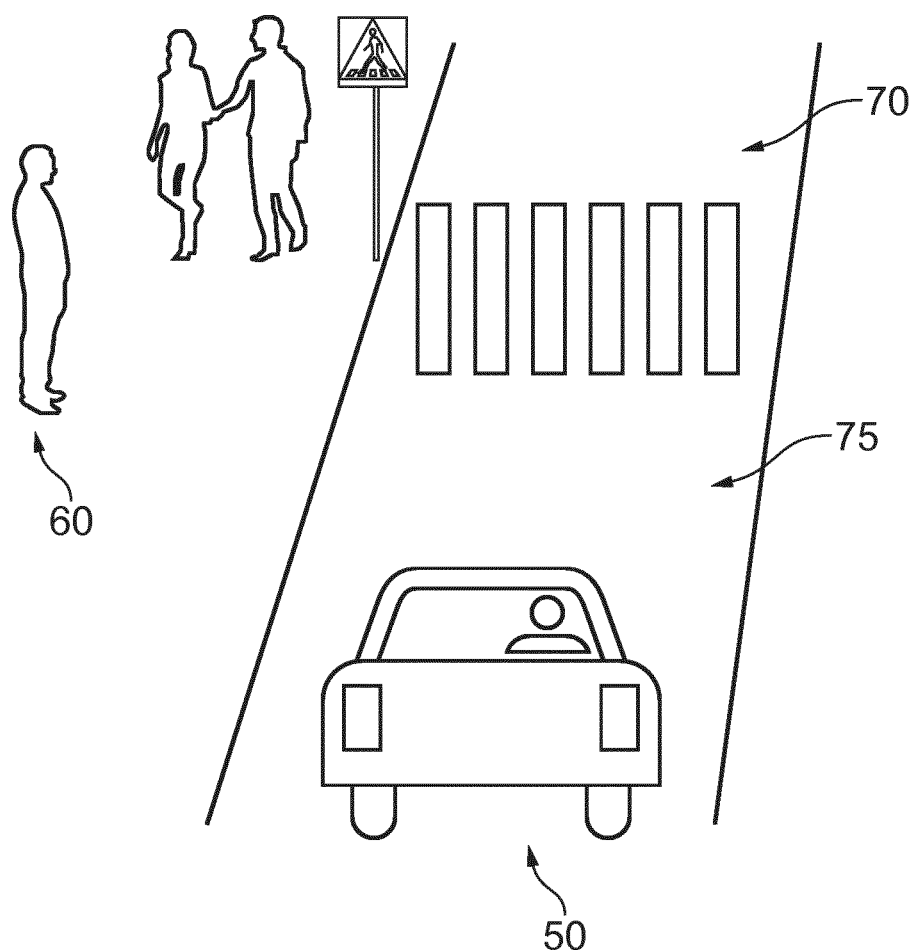
FIG. 8 illustrates a pedestrian about to cross a road and a vehicle travelling along the road.

FIG. 6 illustrates a flow chart of the second method. FIG. 7 illustrates a signaling diagram for signals transferred between the wearable user input device 20, the portable device 200, the network/server 400 and a vehicle 50 in the second method. FIG. 8 illustrates a pedestrian 60 that wishes to cross a road 75 at a pedestrian crossing 70.

In the second method, at block 601 in FIG. 6, the pedestrian wearer 60 of the wearable user input device 20 provides user input in the manner described above in relation to the first method, in order to indicate that he wishes to cross a road.

At block 602 in FIG. 6, the processor 12 of the wearable user input device 20 responds to the user input by controlling at least one of the one or more radio transceivers 21 to transmit a first radio frequency signal 701 to the portable device 200. The first signal 701, may, for example, be sent using a short range wireless protocol such as Bluetooth. An advantage of using a short range wireless protocol is that it enables power consumption at the wearable user input device 20 to be minimized.

The first signal 701 may include data which constitutes a request from the pedestrian 60 to cross the road.

At block 604 in FIG. 6, the one or more radio frequency transceivers 121 located in the portable device 200 receive the first signal 701 transmitted by the wearable user input device 20. Optionally, the processor 112 of the portable device 200 may control the one or more radio frequency transceivers 121 of the portable device 200 to transmit a radio frequency acknowledgment signal to the wearable user input device 20 to indicate to the wearable user input device 20 that the first signal 701 was successfully received by the portable device 200. The radio frequency acknowledgment signal is received by the one or more radio transceivers 21 of the wearable user input device 20. The processor 12 of the wearable user input device 20 responds to reception of the radio frequency acknowledgement signal by controlling the user feedback circuitry 22 of the wearable user input device 20 to provide feedback to the wearer of the wearable user input device 20, in order to indicate that the gesture/user input has been acknowledged by the portable device 200.

At block 604 in FIG. 6, the processor 12 of the portable device 200 responds to reception of the first signal 701 by controlling the positioning circuitry 115 of the portable device 200 to determine the location of the portable device 200 (and therefore the location of the pedestrian). Once the location has been determined, the processor 112 controls the one or more radio frequency transceivers 21 to transmit a second signal 702 which comprises data indicating the determined location and which also includes data that constitutes a request from the pedestrian to cross a road. The data that constitutes the request in the second signal 702 may or may not be the same data as that in the first signal 701. The second signal 702 may be transmitted, for example, using a long range wireless protocol such as a cellular protocol.

At block 605 in FIG. 6, the server/network 400 receives and processes the second signal 702 transmitted by the portable device 200. In practice, the second signal 702 may be received and forwarded by various components of a network before it is processed.

At block 605 in FIG. 6, the processor 312 of the server/network 400 uses the pedestrian crossing location data 332 stored in the memory 314 of the server/network 400 to determine the location of any pedestrian crossings which are proximal to the location of the pedestrian 60 specified in the second signal 702. The processor 312 is able to determine one or more potential trajectories for the pedestrian 60 based on the determined location of the pedestrian 60 and the orientations of any pedestrian crossings nearby.

If no nearby pedestrian crossings are found, the processor 312 of the server/network 400 may conclude that the transmission of the second signal 200 was unintentional/accidental and perform no further actions.

Alternatively, if the processor 312 identifies a relevant pedestrian crossing 70 that the pedestrian 60 is likely to be crossing from the pedestrian crossing location data 332, it analyses the vehicle data 340 stored in the memory 314 to determine whether any autonomous or semi-autonomous vehicles are likely to traverse the pedestrian crossing 70 within a predetermined period of time and therefore prevent the pedestrian 60 from crossing the pedestrian crossing 70 safely. The processor 312 performs this analysis to decide whether to change the motion of any vehicles in order to enable the pedestrian 60 to cross the pedestrian crossing 70.

If the processor 312 of the of the network/server 400 determines that one or more vehicles, such as the vehicle labeled with the reference numeral 50 in FIG. 8, are likely to prevent the pedestrian 60 from crossing the pedestrian crossing 70 safely, it transmits a third signal 703 to the vehicle 50. The third signal 703 is received by the one or more transceivers 521 of the vehicle control system 600 and is processed by the processor 512 of the vehicle control system 600.

At block 607 in FIG. 6, the processor 512 of the vehicle control system 600 changes the motion of one or more vehicles, such as the vehicle 50 illustrated in FIG. 8, in order to enable the pedestrian 60 to cross the pedestrian crossing 70 safely. For example, the processor 512 of the vehicle control system 600 may, for example, redirect the vehicle 50 along a different route so that it is no longer scheduled to traverse the pedestrian crossing 70 (at all, or within a particular timeframe). Alternatively or additionally, the processor 512 of the vehicle control system 600 may cause the motion of the vehicle 50 to decelerate to enable the pedestrian 60 to cross the pedestrian crossing 70.

At block 608 in FIG. 6, the processor 512 of the vehicle control system 600 controls the one or more transceivers 521 of the vehicle control system 600 to transmit a fourth signal 704 to the server/network 400.

The fourth signal 704 indicates to the server/network 400 that the motion of the vehicle 50 has been changed. The fourth signal 704 is received at the one or more transceivers 321 of the server/network 400. The processor 312 of the server/network 400 determines from the received fourth signal 704 that it is now safe for the pedestrian 60 to cross the pedestrian crossing 70. The processor 312 of the server/network 400 then controls the one or more transceivers 321 to transmit a fifth signal 705 to the portable device 200 at block 609 in FIG. 6.

The fifth signal 705 is a radio frequency signal that may be sent, for example, using a long range wireless protocol such as a cellular protocol.

At block 610 in FIG. 6, the one or more transceivers 121 of the portable device 200 receive the fifth signal 705 and it is processed by the processor 112 of the portable device 200. The processor 112 of the portable device 200 determines that the fifth signal 705 indicates that it is now safe for the pedestrian 60 to cross the road 75 and responds by causing the one or more transceivers 121 to transmit a sixth signal 706, to the wearable user input device 20, in order to cause the wearable user input device 20 to provide feedback to the pedestrian 60 indicating that it is safe to cross the road 75.

The sixth signal 706 is a radio frequency signal that may be sent, for example, using a short range wireless protocol such as a Bluetooth protocol.

At block 611 in FIG. 6, the one or more transceivers 21 of the wearable user input device 20 receive the sixth signal 706. At block 612 in FIG. 6, the processor 12 of the wearable user input device 20 responds to reception of the sixth signal 706 by causing the user feedback circuitry 22 to provide an indication to the pedestrian 60 that it is safe to cross the road 75.

In some examples, the user feedback circuitry 22 comprises one or more vibrating elements that are controlled by the processor 12 of the wearable user input device 20 to vibrate in accordance with particular pattern that indicates to the pedestrian 60 that it is safe to cross.

Figure 9:
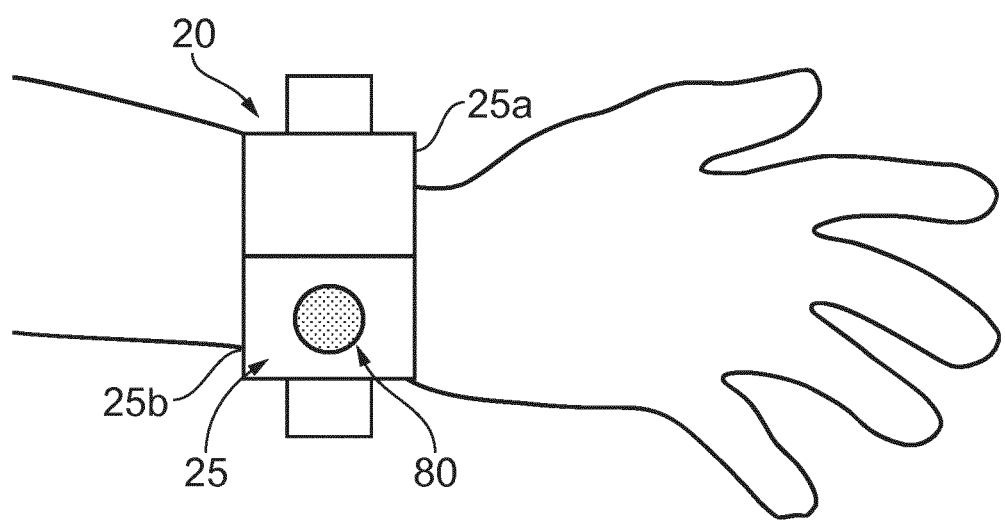
FIG. 9 illustrates the wearable user input device providing feedback to the pedestrian indicating that it is safe for the pedestrian to cross the road.

The user feedback circuitry 22 may comprise a display 25 as shown in FIG. 9. A first portion 25 of the display 25 is allocated to indicating to the user that it is not safe to cross the road and a second portion 25b of the display 25 is allocated to indicating to the user that it is safe to cross the road. In this instance, the processor 12 may, for example, control the second portion 25b of the display to display a graphical indication 80 to indicate that it is safe to cross the road 75. The graphical indication 80 could, for example, be a green circle. If the processor 12 were to control the display 25 to indicate to the pedestrian 60 that it is not safe to cross the road such as in a situation where the sixth signal 706 is never received by the wearable user input device 20, it may, for example, cause the first portion 25a of the display 25 to display a red circle.

Figure 10:
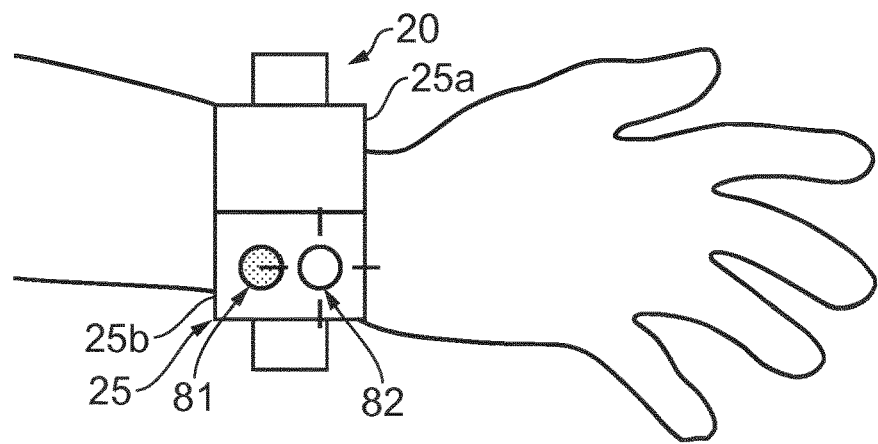
FIG. 10 illustrates the wearable user input device providing feedback to the pedestrian indicating that a vehicle has acknowledged the pedestrian's request, and indicating that an acknowledgement from another vehicle is pending.

The user feedback circuitry 22 of the wearable user input device may also be used to indicate the status of a pedestrian's request to cross a road in relation to multiple vehicles. In FIG. 10, the second portion 25b of the display contains a first graphical indication 81 that a first vehicle has acknowledged the pedestrian's request to cross the road and does not therefore present a danger to the pedestrian. A second graphical indication 82 in the second portion 25b of the display 25 indicates that the pedestrian's request to cross the road has been received but not yet acknowledged by a second vehicle. The second graphical indication 82, may, for example, be a flashing yellow circle.

Figure 11:
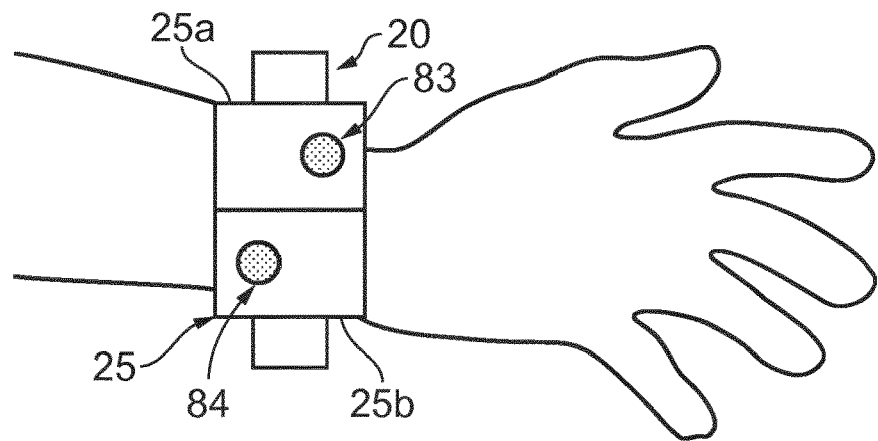
FIG. 11 illustrates the wearable user input device providing feedback to the pedestrian indicating that a vehicle has acknowledged the pedestrian's request, and indicating that another vehicle has failed to provide such an acknowledgement.

In FIG. 11, an example of the wearable user input device 20 is illustrated in which a graphical indication 83 is provided in the first portion of a display 25a which indicates that it is not safe for the pedestrian 60 to cross. This may be because, for example, one vehicle has failed to acknowledge the pedestrian's request to cross the road and a predetermined time period has elapsed since the first signal 701 was transmitted by the wearable user input device 20. Another graphical indication 84 is provided in the second portion 25b of the display 25 in FIG. 11 indicating that another vehicle has acknowledged the pedestrian's request to cross the road and does not pose a threat to the pedestrian 60.

In some alternative examples, the indication to the pedestrian 60 that it is safe to cross the road 75 may be provided by a device that is different from the wearable user input device 20. For example, it might be provided by the portable device 200 (rendering the transmission of the sixth signal 706 redundant) or, alternatively, it may be provided by a different device, such as a different wearable device. For instance, the portable device 200 may transmit the sixth signal 706 to that wearable device which causes it to provide the indication to the pedestrian 60 that it is safe to cross the road 75.

Figure 12:
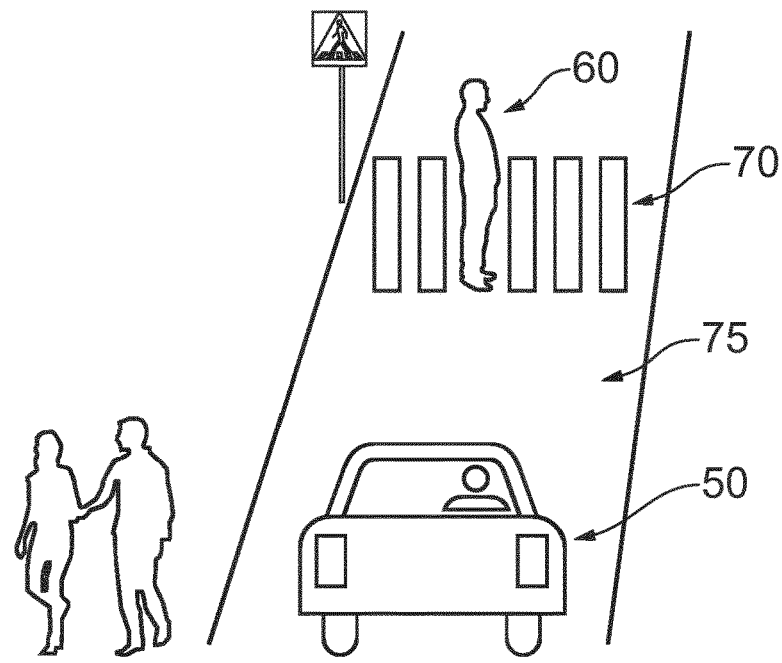
FIG. 12 illustrates a pedestrian crossing the road.

FIG. 12 illustrates the pedestrian 60 crossing the pedestrian crossing 70 after he has been provided with feedback in block 612 of FIG. 6 indicating that it is safe for him to cross the road.

Further Embodiments

Figure 13:
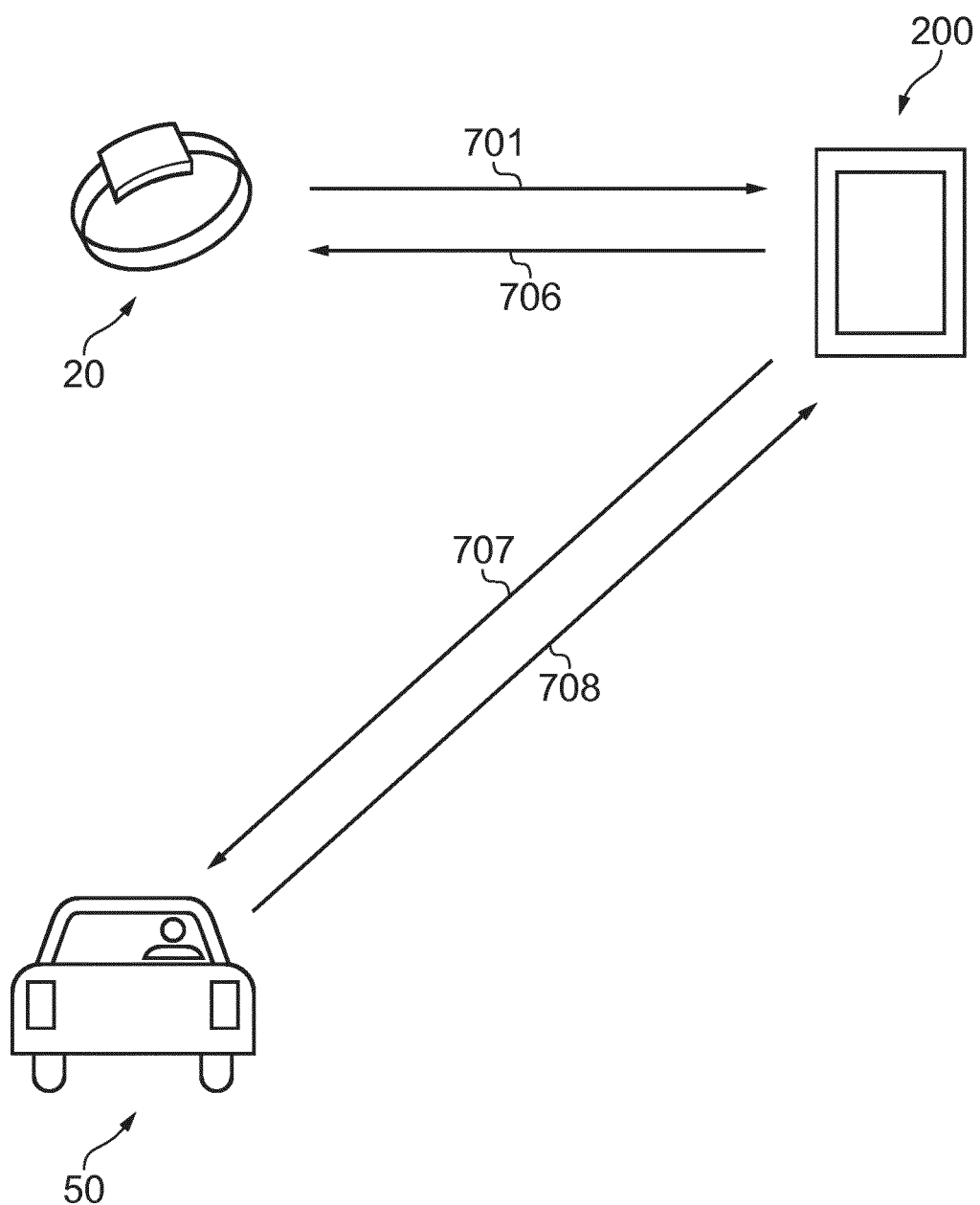
FIG. 13 illustrates a second signaling diagram for signals transferred between a wearable user input device, a portable electronic device and a vehicle.

FIG. 13 illustrates a different embodiment of the invention from that described above in the second method, in that there is not necessarily any communication between the portable device 200 and a network/server 400. Instead, the portable device 200 communicates directly with the vehicle 50. For example, the processor 112 of the portable device 200 may control the one or more radio frequency transceivers 121 of the portable device 200 to transmit a radio frequency signal/beacon 707 which is transmitted to all vehicles within the vicinity of the pedestrian 60. The beacon 707 is then processed in the vehicle control systems 600 of those vehicles. For example, a processor 512 in each vehicle control system 600 may determine whether the vehicle it is located in is scheduled to traverse the pedestrian crossing 70 that the pedestrian 60 wishes to cross within a predetermined period of time and, if so, the processor 512a may change the motion of that vehicle in order to enable the pedestrian to cross the road. The processor 512 of the vehicle control system 600 may then control the one or more radio frequency transceivers 521 of the vehicle control system 600 to transmit a beacon/signal 708 to the portable device 200 which indicates that it is safe for the pedestrian to cross the road.

Figure 14:
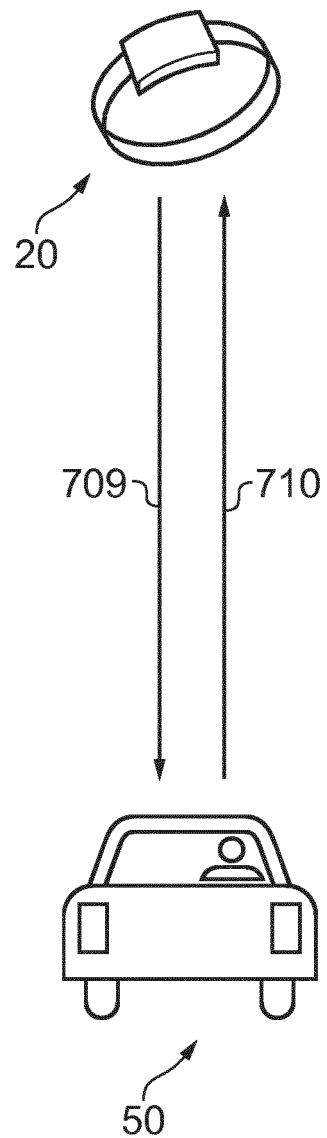
FIG. 14 illustrates a third signaling diagram for signals transferred between a wearable user input device and a vehicle.

A further embodiment is illustrated in FIG. 14. In FIG. 14, neither the service/network 400 nor the portable device 200 are present. Instead, the wearable user input device 20 communicates directly with the vehicle 50.

In the FIG. 14 embodiment, the processor 12 of the wearable user input device 20 causes the one or more transceivers 21 of the wearable user input device 20 to transmit a radio frequency signal/beacon 709 which is transmitted to all vehicles within the vicinity of the pedestrian 60. The beacon 709 is received, processed and responded to by the vehicle control system 600 in the same manner as that described above, except that the beacon/signal 710 transmitted by the vehicle control system 600 is received and processed by the wearable user input device 20 rather than the portable device 200.

Figure 15:
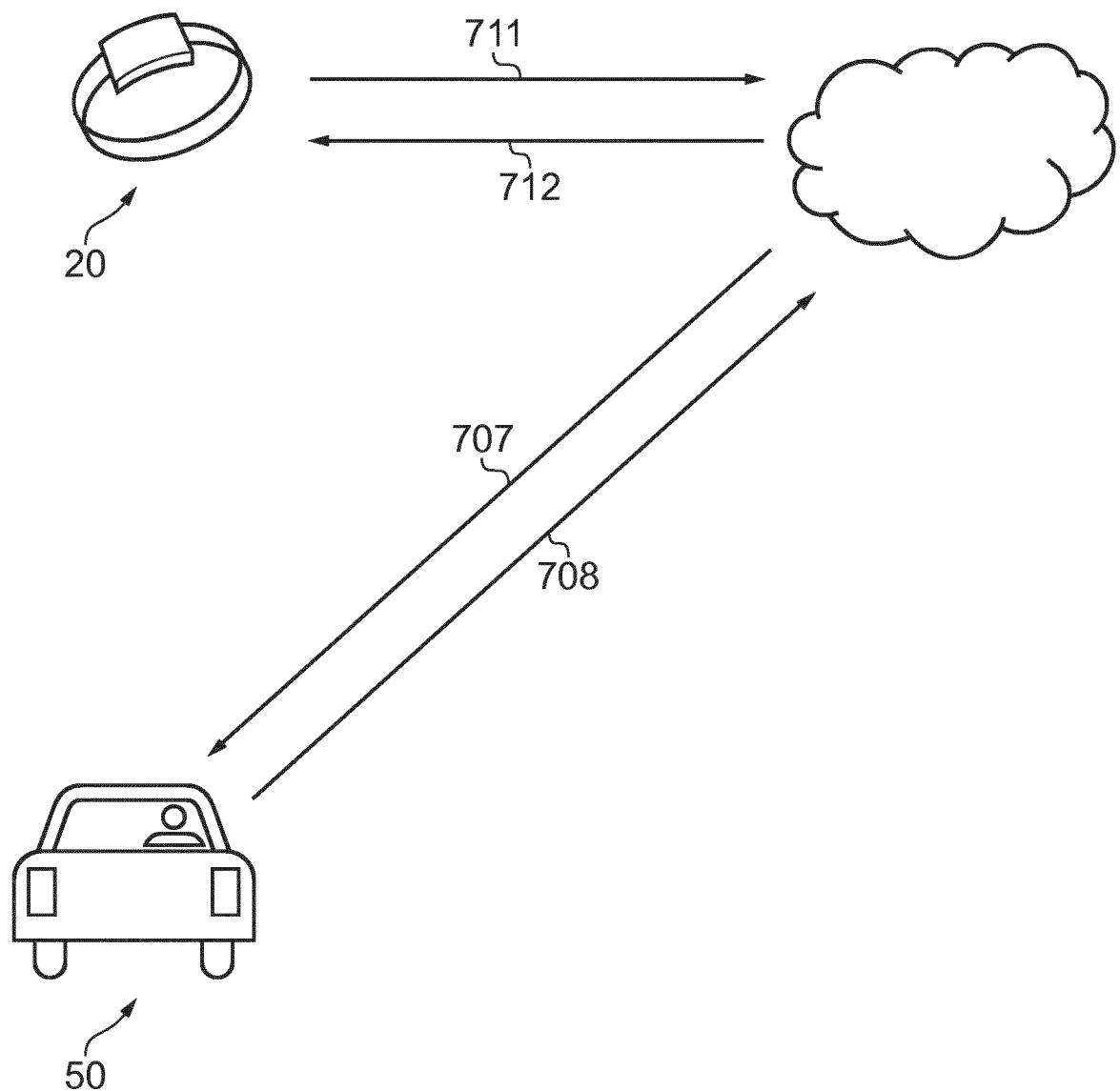
FIG. 15 illustrates a fourth signaling diagram for signals transferred between a wearable user input device, a network/server and a vehicle.

Another embodiment is illustrated in FIG. 15. In this embodiment, the portable device 200 is not present. The FIG. 15 embodiment differs from the second method in that the wearable user input device 20 transmits a radio frequency signal 711 directly to the network/server 400 and receives a signal 712 directly from it. It does not communicate with the network/server 400 via the portable device 200.

Further Comments

References to 'computer-readable storage medium', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in FIGS. 5 and 6 may represent actions in a method and/or sections of code in one or more computer programs 17, 117, 317, 517. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Although embodiments of the present invention have been described in the preceding paragraphs with reference to various examples, it should be appreciated that modifications to the examples given can be made without departing from the scope of the invention as claimed. For example, the vehicle control system 600 may be configured to transmit radio frequency signals to other cars to indicate the location of the pedestrian 60. That is, in effect, the vehicle control system 600 may forward on the request made by the pedestrian 60 to cross the road and the location of the pedestrian 60.

In some implementations, the pedestrian 60 may cancel his request to cross a road by stating the wearable user input device 20 and/or by walking away from the pedestrian crossing 70.

In some situations in which embodiments of the invention are employed, one road may be positioned above another. In such embodiments, the road that the pedestrian 60 wishes to cross may be determined by tracking the location of the pedestrian 60 over a period of time (for example, using location data determined over time by the wearable user input device 20 and/or the portable device 200). For instance, if the motion sensor(s) 23 of the wearable user input device 20 provide inputs which indicate that the pedestrian 60 has reached a particular height above ground (such as by walking up stairs), it may be determined that the road that the pedestrian 60 wishes to cross is above ground. Additionally or alternatively, some aspect of the directionality of the gesture provided by the pedestrian 60 may indicate the expected direction of travel of the pedestrian 60 (and therefore the road that the pedestrian 60 wishes to cross). The gesture may involve, for example, pointing an arm across the road that the pedestrian 60 wishes to cross.

Although embodiments of the invention are described above in the context of a pedestrian crossing 70, embodiments of the invention may be used to enable a pedestrian to cross a road safely where a pedestrian crossing 70 is not present.

The description above mentions that the processor 312 is able to determine one or more potential trajectories for the pedestrian 60 based on the determined location of the pedestrian 60 and the orientations of any pedestrian crossings nearby. In some other examples, the one or more trajectories for the pedestrian 60 could be determined based on the determined location of the pedestrian 60 and the orientations of any roads nearby (as indicated in the road data 331).

The description above also states in relation to block 605 in FIG. 6 that if no nearby pedestrian crossings are found, the processor 312 of the server/network 400 may conclude that the transmission of the second signal 200 was unintentional/accidental and perform no further actions. This need not necessarily be the case. It may be possible for the pedestrian 60 to perform an additional user input/gesture to confirm his intention to cross, so that any potential ambiguity is reduced/removed. For instance, the pedestrian 60 might point his arm across the road 75 and wave his arm to confirm his intention to cross the road. In some implementations, the first signal 701 and/or the second signal 702 are not transmitted unless the additional user input/gesture is performed.

Some embodiments of the invention may not involve crossing a road. For example, embodiments of the invention may be used to hail an autonomous or semi-autonomous vehicle that is operating as a bus or a taxi. When the relevant user input is provided by the pedestrian, it causes the motion of the bus/taxi to change (for example it may cause the bus/taxi to be re-directed to the pedestrian, or to decelerate)

In other embodiments of the invention that do not involve crossing a road, the pedestrian 60 may provide user input that indicates that he is walking along a road. The motion of autonomous/semi-autonomous vehicles may be changed on the basis of that input in order to provide the pedestrian 60 with safe passage along the road.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A method comprising:
   receiving a signal, transmitted in response to a user input at a device of a pedestrian and comprising a request to cross a road;
   determining a location of the pedestrian;
   associating the determined location of the pedestrian with pedestrian crossing location data;
   determining, based on the pedestrian crossing location data, whether any pedestrian crossings are proximal to the location of the pedestrian based on one or more potential trajectories for the pedestrian within a predetermined period of time and orientations of any pedestrian crossings along the one or more potential trajectories within the predetermined period of time;
   in response to no pedestrian crossings being found to be proximal to the location of the pedestrian, concluding that the transmission of the signal was unintentional; and
   in response to a pedestrian crossing being found to be proximal to the location of the pedestrian, responding to the signal by controlling motion of an autonomous or semi-autonomous vehicle in order to enable the pedestrian to cross the road.

2. The method of claim 1, wherein the autonomous or semi-autonomous vehicle is an autonomous vehicle that is configured to navigate, steer, accelerate and decelerate autonomously without any human driver being positioned in or outside the vehicle that is operating the vehicle.

3. The method of claim 1, further comprising: causing a signal to be transmitted to the device in order to cause an indication to be provided to the pedestrian that it is safe to cross the road.

4. The method of claim 1, further comprising:
   determining one or more potential crossing trajectories of the pedestrian based, at least in part, on an orientation of the pedestrian crossing near the location of the pedestrian or an orientation of a road near the location of the pedestrian.

5. The method of claim 4, wherein the one or more potential crossing trajectories are determined using the pedestrian crossing location data.

6. The method of claim 1, wherein the device is wearable on an appendage of a user, and the user input is a gesture input which is detected by at least one motion sensor of the device.

7. A non-transitory computer-readable medium comprising computer program instructions for causing an apparatus to perform the method of claim 1.

8. An apparatus comprising:

at least one processor; and memory comprising computer program code configured, with the at least one processor, to cause the apparatus to:

receive a signal, transmitted in response to a user input at a device of a pedestrian and comprising a request to cross a road;

determine a location of the pedestrian;

associate the determined location of the pedestrian with pedestrian crossing location data;

determine, based on the pedestrian crossing location data, whether any pedestrian crossings are proximal to the location of the pedestrian based on one or more potential trajectories for the pedestrian within a predetermined period of time and orientations of any pedestrian crossings along the one or more potential trajectories within the predetermined period of time;

in response to no pedestrian crossings being found to be proximal to the location of the pedestrian, conclude that the transmission of the signal was unintentional; and in response to a pedestrian crossing being found to be proximal to the location of the pedestrian, respond to the signal by controlling motion of an autonomous or semi-autonomous vehicle in order to enable the pedestrian to cross the road.

9. The apparatus of claim 8, wherein the autonomous or semi-autonomous vehicle is an autonomous vehicle that is configured to navigate, steer, accelerate and decelerate autonomously without any human driver being positioned in or outside the vehicle that is operating the vehicle.

10. The apparatus of claim 8, wherein the computer program code is configured, with the at least one processor, to cause the apparatus to:

cause a signal to be transmitted to the device in order to cause an indication to be provided to the pedestrian that it is safe to cross the road.

11. The apparatus of claim 8, wherein the computer program code is configured to, with the at least one processor, cause the apparatus to:

associate the determined location of the pedestrian with pedestrian crossing location data, wherein one or more potential trajectories are determined using the pedestrian crossing location data.

12. The apparatus of claim 8, wherein the device is wearable on an appendage of a user, and the user input is a gesture input which is detected by at least one motion sensor of the device.

13. An autonomous vehicle or a semi-autonomous vehicle comprising the apparatus of claim 8.

14. An apparatus comprising:

at least one processor; and memory comprising computer program code configured, with the at least one processor, to cause the apparatus to:

receive a signal, transmitted by a device of a pedestrian in response to a user input and comprising a request to cross a road;

determine, where a first road is positioned above a second road, which one of the first and second roads the pedestrian wishes to cross based at least in part on a determined location of the pedestrian, wherein the determined location of the pedestrian includes the pedestrian's height above ground; and respond to the signal by controlling motion of an autonomous or semi-autonomous vehicle, based at least in part on the determined road, in order to enable the pedestrian to cross the road at a pedestrian crossing.

15. The apparatus of claim 14, wherein the autonomous or semi-autonomous vehicle is an autonomous vehicle that is configured to navigate, steer, accelerate and decelerate autonomously without any human driver being positioned in or outside the vehicle that is operating the vehicle.

16. The apparatus of claim 14, wherein the computer program code is configured to, with the at least one processor, cause the apparatus to:

cause a signal to be transmitted to the device in order to cause an indication to be provided to the pedestrian that it is safe to cross the road.

17. The apparatus of claim 14, wherein the device is wearable on an appendage of the user, and the user input is a gesture input which is detected by at least one motion sensor of the device.

\* \* \* \* \*